US011378037B2

(12) United States Patent
Song

(10) Patent No.: US 11,378,037 B2
(45) Date of Patent: Jul. 5, 2022

(54) THRUST REVERSER ASSEMBLY AND METHOD OF OPERATING

(71) Applicant: MRA Systems, LLC, Baltimore, MD (US)

(72) Inventor: Qiming Song, Shanghai (CN)

(73) Assignee: MRA SYSTEMS, LLC, Baltimore, MD (US)

( * ) Notice: Subject to any disclaimer, the term of this patent is extended or adjusted under 35 U.S.C. 154(b) by 139 days.

(21) Appl. No.: 16/497,959

(22) PCT Filed: Mar. 27, 2018

(86) PCT No.: PCT/US2018/024675
§ 371 (c)(1),
(2) Date: Sep. 26, 2019

(87) PCT Pub. No.: WO2018/183401
PCT Pub. Date: Oct. 4, 2018

(65) Prior Publication Data
US 2021/0108594 A1     Apr. 15, 2021

(30) Foreign Application Priority Data

Mar. 31, 2017 (CN) .......................... 201710207211.6

(51) Int. Cl.
*F02K 1/72* (2006.01)
*F02K 3/04* (2006.01)
*F02K 1/76* (2006.01)

(52) U.S. Cl.
CPC ................ *F02K 1/72* (2013.01); *F02K 1/763* (2013.01); *F02K 3/04* (2013.01)

(58) Field of Classification Search
CPC . F02K 1/763; F02K 1/766; F02K 1/62; F02K 1/625; F02K 1/70; F02K 1/72
See application file for complete search history.

(56) References Cited

U.S. PATENT DOCUMENTS

| 4,278,220 A | 7/1981 | Johnston et al. |
| 4,976,466 A * | 12/1990 | Vauchel ................... F02K 1/70 239/265.29 |
| 7,874,142 B2 | 1/2011 | Beardsley |
| 2004/0068978 A1 | 4/2004 | Lair et al. |

(Continued)

FOREIGN PATENT DOCUMENTS

| CN | 105190004 A | 12/2015 |
| CN | 105209740 A | 12/2015 |
| EP | 1462642 A1 | 9/2004 |

OTHER PUBLICATIONS

International Search Report and Written Opinion of the International Searching Authority for Counterpart PCT/US2018/024675, dated Jul. 4, 2018.

(Continued)

*Primary Examiner* — Gerald L Sung
(74) *Attorney, Agent, or Firm* — Xsensus LLP

(57) ABSTRACT

An apparatus and method of operating a translating cowl for a turbine engine. The translating cowl is moveable between a first position and a second position. The translating cowl includes a fixed cascade element located within and a blocker door that is operably coupled to die translating cowl. Hie blocker door is movable between a stowed position and a deployed position.

13 Claims, 9 Drawing Sheets

(56) References Cited

U.S. PATENT DOCUMENTS

| | | | | |
|---|---|---|---|---|
| 2005/0102996 A1* | 5/2005 | Lair | ............................ | E05C 3/06 |
| | | | | 60/226.2 |
| 2012/0067024 A1 | 3/2012 | Vauchel | | |
| 2012/0079805 A1 | 4/2012 | Stuart et al. | | |
| 2014/0270935 A1 | 9/2014 | Willett et al. | | |
| 2014/0353399 A1 | 12/2014 | Stuart et al. | | |
| 2015/0204272 A1 | 7/2015 | James | | |
| 2015/0267641 A1* | 9/2015 | Gormley | .................. | F02K 1/766 |
| | | | | 239/265.19 |
| 2016/0003190 A1* | 1/2016 | Weiner | .................. | F02K 1/1223 |
| | | | | 239/265.33 |
| 2017/0226961 A1* | 8/2017 | Smith | ........................ | F02K 1/72 |
| 2017/0321631 A1* | 11/2017 | Calder | ...................... | F02K 1/70 |

OTHER PUBLICATIONS

Office Action dated Jun. 3, 2021 in Chinese Patent Application No. 201710207211.6, 25 pages.

* cited by examiner

THRUST REVERSER ASSEMBLY AND METHOD OF OPERATING

This application is a National Phase application of International Application No. PCT/US2018/024675, filed Mar. 27, 2018, which claims the benefit of CN Patent Application Serial No. 201710207211.6 filed Mar. 31, 2017, both which are incorporated herein by reference in its entirety.

BACKGROUND OF THE INVENTION

Turbine engines, and particularly gas or combustion turbine engines, are rotary engines that extract energy from a flow of combusted gases passing through the engine onto a multitude of turbine blades. Turbine engines have been used for land and nautical locomotion and power generation, but are most commonly used for aeronautical applications such as for aircraft, including helicopters. In aircraft, turbine engines are used for propulsion of the aircraft. In terrestrial applications, turbine engines are often used for power generation.

Thrust reverser assemblies are used within turbine engines to provide a reverse thrust, for example, for deceleration. Reverse thrust is typically achieved by deploying a door assembly into a bypass duct which diverts air from an aft direction to forward direction. Traditionally the door is part of a translating cowl requiring a separate actuator assembly which can add weight and take up valuable space within the nacelle.

BRIEF DESCRIPTION OF THE INVENTION

In one aspect, the present disclosure relates to a thrust reverser assembly for a turbine engine including a core engine, a nacelle surrounding at least a portion of the core engine to at least partially define a bypass duct between the nacelle and the core engine, including a translating cowl moveable between a first position and a second position, a fixed cascade element located within the translating cowl when the translating cowl is in the first position, a blocker door having a leading edge and a trailing edge that is operably coupled to the translating cowl and where the blocker door is movable between a stowed position wherein the blocker door forms a portion of the bypass duct and a deployed position, where the blocker door extends into the bypass duct to deflect air through the cascade element, and a biasing element operably coupled to the blocker door and configured to bias the blocker door from the stowed position into an initial position wherein the blocker door is partially within the bypass duct and the leading edge forms a gap with a portion of the thrust reverser assembly, wherein, during operating, airflow through bypass duct enters the gap and the blocker door is configured to create a scooping effect that moves the blocker door to the deployed position and moves the translating cowl to the second position.

In another aspect, the present disclosure relates to a method of operating an aircraft engine, comprising generating a fore-to-aft airflow through a bypass duct of the aircraft engine; and deploying a blocker door from a stowed position to an initial position where the blocker door is partially within the bypass duct such that a leading edge of the blocker door forms a gap with a portion of the aircraft engine, wherein the airflow through the bypass duct enters the gap and the blocker door interacts with the airflow such that the blocker door is moved to the deployed position.

In another aspect, the present disclosure relate to a turbine engine; comprising a core engine having an inner cowl, a nacelle surrounding at least a portion of the core engine, a bypass duct defined by and between the nacelle and the core engine and defining a fore-to-aft bypass duct, a translating cowl moveable between a first position and a second position, a blocker door having a leading edge and a trailing edge operably coupled to the inner cowl and movable between a stowed position and an deployed position, where the blocker door extends into the bypass duct to deflect air, a biasing element operably coupled to the blocker door and configured to bias the blocker door from the stowed position into an initial position wherein the blocker door is partially within the bypass duct and the leading edge forms a gap with a remainder of the inner cowl, wherein, during operating, airflow through bypass duct enters the gap and the blocker door is configured to interact with the airflow to move the blocker door to the deployed position.

1. A thrust reverser assembly for a turbine engine including a core engine, a nacelle surrounding at least a portion of the core engine to at least partially define a bypass duct between the nacelle and the core engine, including:
   a translating cowl moveable between a first position and a second position;
   a fixed cascade element located within the translating cowl when the translating cowl is in the first position;
   a blocker door having a leading edge and a trailing edge that is operably coupled to the translating cowl and where the blocker door is movable between a stowed position wherein the blocker door forms a portion of the bypass duct and a deployed position, where the blocker door extends into a bypass duct conduit to deflect air through the cascade element; and
   a biasing element operably coupled to the blocker door and configured to bias the blocker door from the stowed position into an initial position wherein the blocker door is partially within the bypass duct and the leading edge forms a gap with a portion of the thrust reverser assembly through which an airflow enters the gap.

2. The thrust reverser assembly of claim 1, further comprising a latch assembly operable between a latch position, where the blocker door is held in the stowed position, and a release position, where the door may be pivoted to the deployed position.

3. The thrust reverser assembly of claim 2 wherein the latch assembly comprises a latch keep carried by one of the blocker door and a portion of the thrust reverser assembly and having a strike seat in which a strike may be removably received a latch carried by the other of the door and a portion of the thrust reverser assembly and having a catch configured to engage the strike.

4. The thrust reverser assembly of claim 2, further comprising a control module configured to move the latch assembly to the release position.

5. The thrust reverser assembly of claim 1, further comprising a spring-damper assembly operably coupled to the blocker door and wherein the spring-damper assembly is configured to moderate a speed of the blocker door as it moves to the deployed position.

6. The thrust reverser assembly of claim 5 wherein the spring-damper assembly further includes a biasing element that is configured to move the blocker door to the stowed position when the airflow through the bypass duct is stopped.

7. The thrust reverser assembly of claim 6 wherein the biasing element is further configured to move the blocker door towards the stowed position when the airflow through the bypass duct reduces with a slowing speed of an aircraft.

8. The thrust reverser assembly of claim 5, further comprising a second spring-damper assembly operably coupled to the translating cowl and wherein the spring-damper assembly is configured to bias the translating cowl to the first position.

9. The thrust reverser assembly of claim 1, wherein the blocker door is configured to create a scooping effect that moves the blocker door to the deployed position and moves the translating cowl to the second position.

10. A method of operating an aircraft engine, comprising:
   generating a fore-to-aft airflow through a bypass duct of the aircraft engine; and
   deploying a blocker door from a stowed position to an initial position where the blocker door is partially within the bypass duct such that a leading edge of the blocker door forms a gap with a portion of the aircraft engine; and
   moving the blocker door to a deployed position when an airflow passes through the gap to interact with the blocker door such that the blocker door is moved to the deployed position.

11. The method of claim 10 wherein the deploying the blocker door to the initial position comprises unlatching a leading edge of the blocker door.

12. The method of claim 10 wherein the deploying the blocker door to the initial position comprises biasing the leading edge of the blocker door to the initial position.

13. The method of claim 10, further comprising applying hydraulic pressure to provide a damping force to suppress a speed of the blocker door moving to the deployed position.

14. The method of claim 10 wherein a translating cowl is simultaneously moved, with the blocker door, from a first position to a second position based on the airflow interacting with the translating cowl.

15. The method of claim 14, further comprising redirecting, via the blocker door in the deployed position, air to exit through a cascade element that is located within the translating cowl when the translating cowl is in the first position.

16. A turbine engine, comprising:
   a core engine having an inner cowl;
   a nacelle surrounding at least a portion of the core engine;
   a bypass duct defined by and between the nacelle and the core engine and defining a fore-to-aft bypass duct;
   a translating cowl moveable between a first position and a second position;
   a blocker door having a leading edge and a trailing edge operably coupled to the inner cowl and movable between a stowed position and an deployed position, where the blocker door extends into the bypass duct to deflect air; and
   a biasing element operably coupled to the blocker door and configured to bias the blocker door from the stowed position into an initial position wherein the blocker door is partially within the bypass duct and the leading edge forms a gap with the inner cowl through which an airflow enters the gap.

17. The turbine engine of claim 16, further comprising a latch assembly operable between a latch position, where the blocker door is held in the stowed position, and a release position, where the door may be pivoted to the deployed position 18. The turbine engine of claim 17, wherein the latch assembly comprises a latch keep carried by one of the blocker door and a portion of the thrust reverser assembly and having a strike seat in which a strike may be removably received a latch carried by the other of the door and a portion of the thrust reverser assembly and having a catch configured to engage the strike.

19. The turbine engine of claim 17, further comprising a control module configured to move the latch assembly to the release position.

20. The turbine engine of claim 16, further comprising a spring-damper assembly operably coupled to the blocker door and wherein the spring-damper assembly is configured to moderate a speed of the blocker door as it moves to the deployed position.

21. The turbine engine of claim 20 wherein the spring-damper assembly further includes a biasing element that is configured to move the blocker door to the stowed position when the airflow through the bypass duct is stopped.

22. The turbine engine of claim 16 wherein, when the airflow enters the gap the blocker door is configured to interact with the airflow such that the blocker door moves to the deployed position.

DETAILED DESCRIPTION OF THE INVENTION

Figure 1:
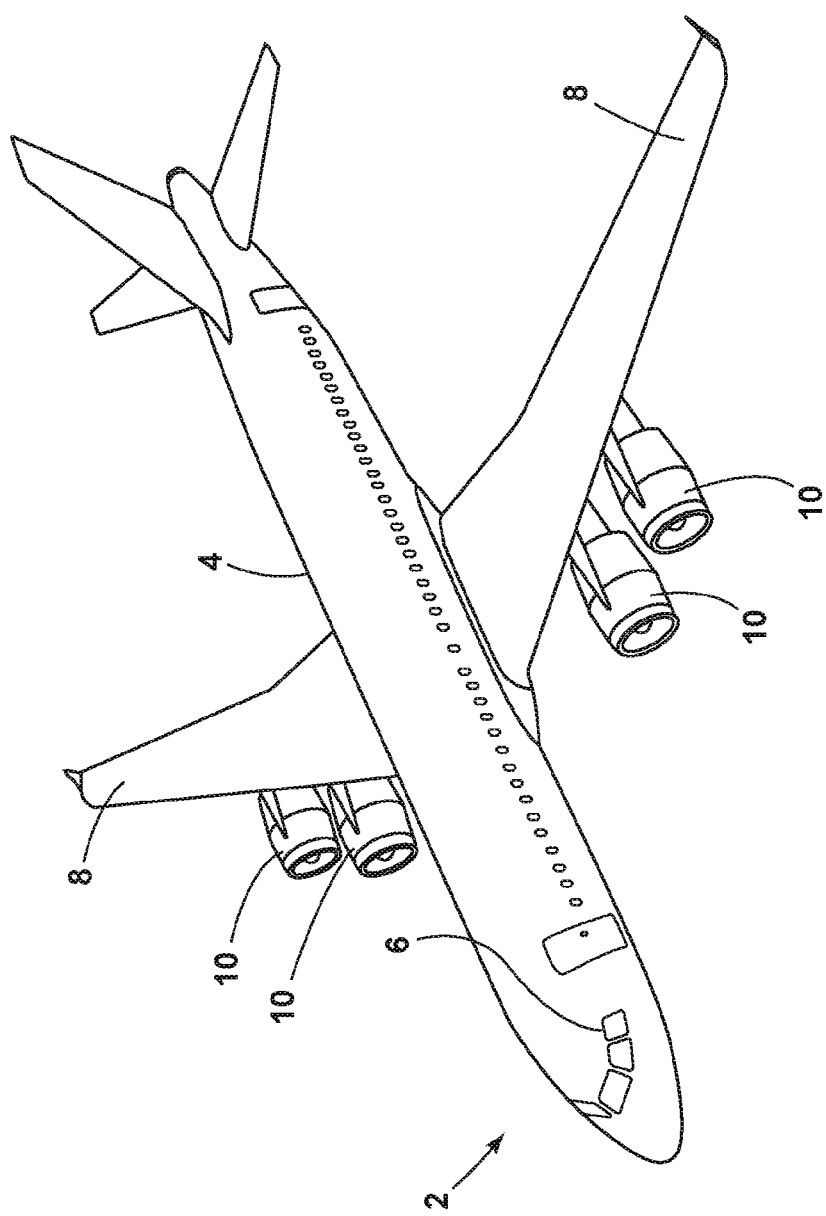
FIG. 1 is a schematic perspective diagram of an aircraft with turbine engines that can incorporate aspects of the disclosure.

Aspects of the present disclosure are directed to a thrust reverser assembly, particularly in a gas turbine engine of an aircraft. For purposes of illustration, the present disclosure will be described with respect to an aircraft gas turbine engine. It will be understood, however, that the present disclosure is not so limited and can have general applicability in non-aircraft applications, such as other mobile applications.

Traditional thrust reversers for turbofan engines utilize a translating cowl design in which the translating cowl is pushed axially aft via an actuator to expose the cascades. A series of blocker doors are simultaneously deployed to block the fan duct and re-direct flow through the cascades, turning the flow forward to provide reverse thrust.

Aspects of the present disclosure utilize a scooping effect to enable a planned opening of the blocker door. Allowing a small portion of air into an otherwise closed area creates a desired scooping effect that in turn enables the opening of the blocker doors. The thrust reverser assemblies disclosed herein harnesses energy stored in high speed air located in the bypass duct and transfers it to causing a scooping effect for deploying the blocker doors described herein.

The re-direction of the airflow may be achieved using only the angle and shape of the blocker doors described herein.

As used herein, the term "forward" or "upstream" refers to moving in a direction toward the engine inlet, or a component being relatively closer to the engine inlet as compared to another component. The term "aft" or "downstream" refers to a direction toward the rear or outlet of the engine relative to the engine centerline. Additionally, as used herein, the terms "radial" or "radially" refer to a dimension extending between a center longitudinal axis of the engine and an outer engine circumference. It should be further understood that "a set" can include any number of the respectively described elements, including only one element.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present disclosure, and do not create limitations, particularly as to the position, orientation, or use of the present disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 illustrates an aircraft 2 which can also include a fuselage 4, a cockpit 6 positioned in the fuselage 4, and wing assemblies 3 extending outward from the fuselage 4. The aircraft 2 can also include multiple engines, including turbine engines 10 which by way of non-limiting example can be turbojet engines, turbofan engines, or turboprop engines. While a commercial aircraft 2 has been illustrated, it is contemplated that aspects of the disclosure described herein can be used in any type of aircraft 2. Further, while two turbine engines 10 have been illustrated on each of the wing assemblies 8, it will be understood that any number of turbine engines 10 including a single turbine engine 10 on the wing assemblies 8, or even a single turbine engine mounted in the fuselage 4 can be included.

Figure 2:
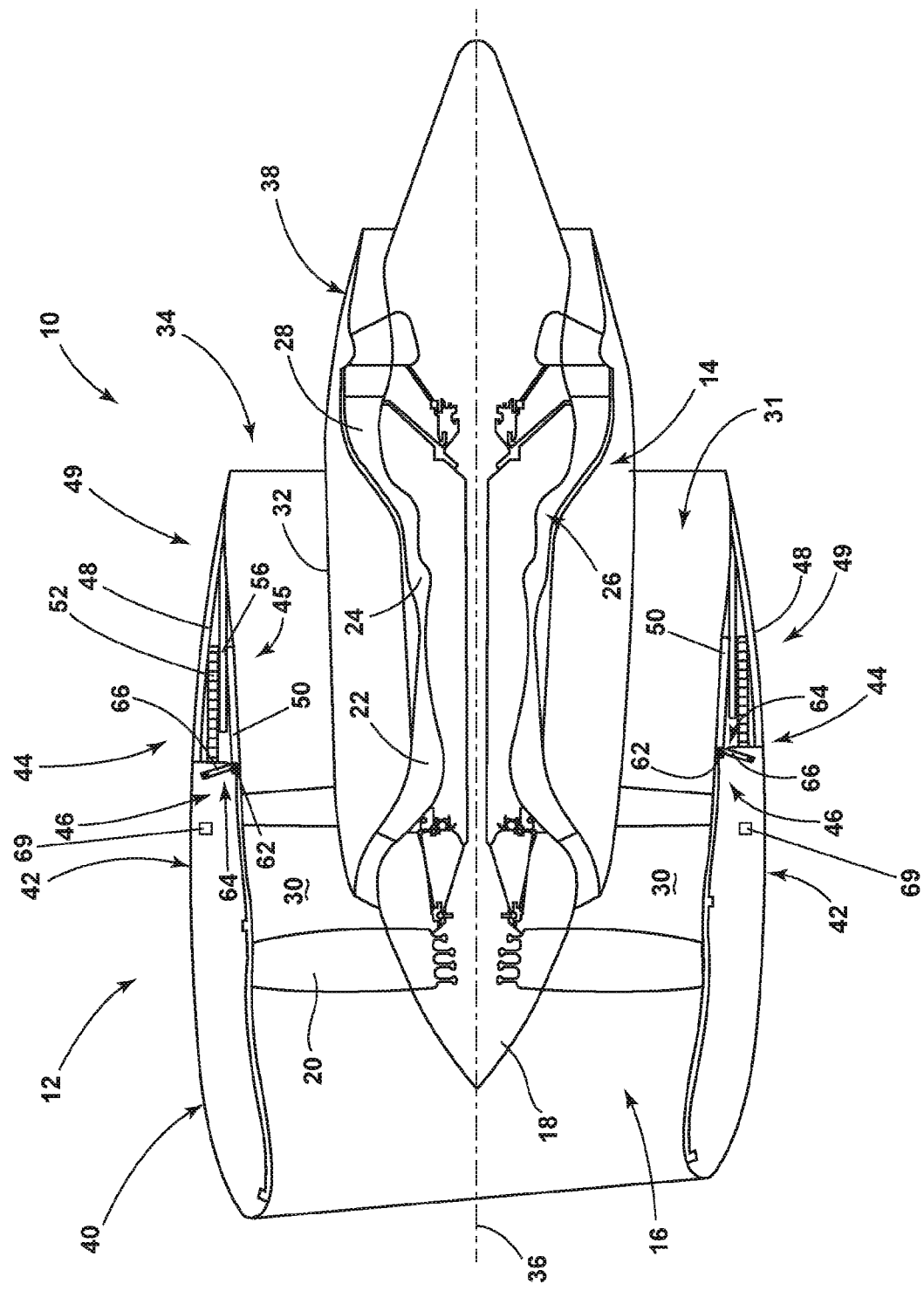
FIG. 2 is a schematic cross-sectional diagram of a turbine engine that can be utilized in the aircraft of FIG. 1 and includes a thrust reverser assembly in a stowed position.

FIG. 2 schematically illustrates an exemplary turbine engine 10 including a nacelle 12 surrounding at least a portion of a core engine 14. The engine 10 has a generally longitudinal extending axis or centerline 36 extending forward to aft. A fan assembly 16 located in front of the core engine 14 includes a spinner nose 18 projecting forwardly from an array of fan blades 20. The core engine 14 is schematically represented as including a high-pressure compressor 22, a combustor 24, a high-pressure turbine 26 and a low-pressure turbine 28. A large portion of the air that enters the fan assembly 16 is bypassed to the rear of the engine 10 to generate engine thrust and defines a bypass airflow 100. The bypassed airflow 100 passes through an annular-shaped bypass duct 30 defining a fore-to-aft airflow bypass duct conduit 31 between the nacelle 12 and an inner core cowl 32, and exits the bypass duct 30 through a fan exit nozzle 34. The inner core cowl 32 defines the radially inward boundary of the bypass duct 30, and provides a transition surface to a primary exhaust nozzle 38 that extends aft from the core engine 14. The nacelle 12 defines the radially outward boundary of the bypass duct 30. The bypassed fan air flows through the fore-to-aft airflow bypass duct conduit 31 before being exhausted through the fan exit nozzle 34.

The nacelle 12 can include three primary elements that define the external boundaries of the nacelle 12: an inlet assembly 40, a fan cowl 42 interfacing with an engine fan case that surrounds the fan blades 20, and a thrust reverser assembly 44 located aft of the fan cowl 42. The thrust reverser assembly 44 includes three primary components: a translating cowl 48 mounted to the nacelle 12 and adapted to move from a first position 49 (FIG. 2) to a second position 53 (FIG. 3), a cascade element 52, and multiple blocker doors 50 adapted to be deployed (FIG. 3) from a stowed position 45, (FIG. 2), where the Mocker door 50 is radially inward from the cascade element 52. While two translating cowls 48 and blocker doors 50 are shown in FIG. 2, a set of translating cowls 48 are typically circumferentially spaced around the nacelle 12 and a set of blocker doors 50 are radially spaced about the core engine 14.

The translating cowl 48 is flush with the fan cowl 42 in the first position 49 (FIG. 2). The translating cowl 48 can comprise multiple panels together circumscribing the cascade element 52. The translating cowl 48 stretches aft from the fan cowl 42 and defines an aft portion of the fore-to-aft airflow bypass duct conduit 31. In the second position 53 (FIG. 3) the translating cowl 48 moves in a substantially axial direction aft of the first position 49 (FIG. 2). The translating cowl can include an interior portion 56 to which the blocker door 50 can be mounted.

Figure 3:
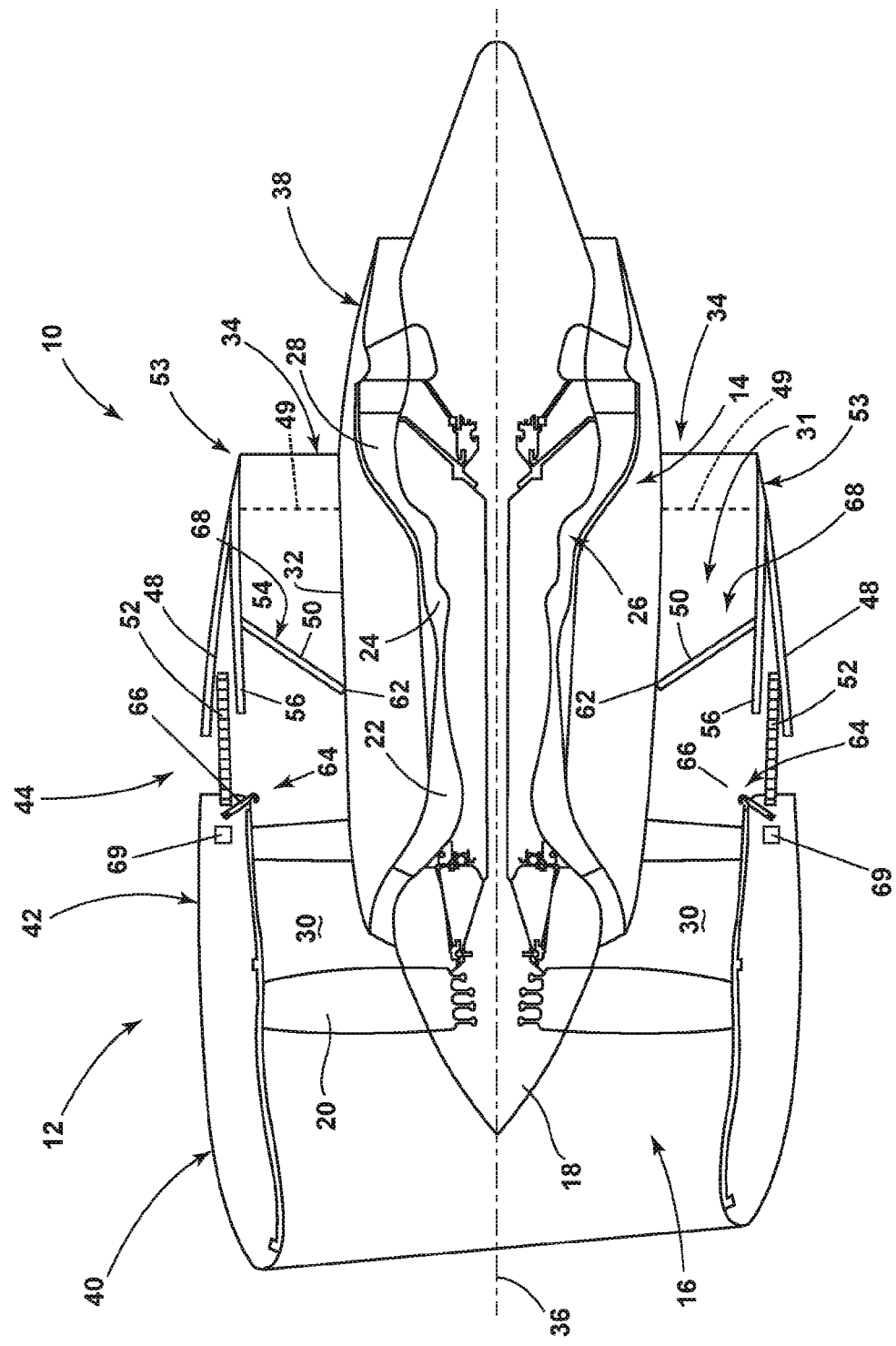
FIG. 3 is a schematic cross-sectional diagram of the turbine engine of FIG. 2 including the thrust reverser assembly in a deployed position.

The blocker door 50 forms a radially outer portion of the bypass duct 30 in the first position 49. The translating cowl 48 is coupled to the blocker door 50 so that both are adapted to be moveable between the first position 49 (FIG. 1) and a second position 53 (FIG. 2). Simultaneously the blocker door 50 moves from the stowed position 45 (FIG. 2) to the deployed position 68 (FIG. 3). In this manner the blocker door 50 moves both axially aft and radially inward at the same time.

The cascade element 52 is a fixed structure of the nacelle 12. In one non-limiting example the cascade element can be mounted to a non-moveable portion of the nacelle 12.

A latch assembly 64 is also included in the thrust reverser assembly 44 and includes a latch 66 carried by one of the blocker door 50 or a portion 46 of the thrust reverser assembly 44 located aft of the fan cowl 42.

A control module 69, for example but not limited to a Full Authority Digital Engine/Electronics Control (FADEC) can be located within the nacelle 12 and can be in communication with the thrust reverser assembly 44. By way of non-limiting example, the control module 69 is in direct communication with the latch assembly 64.

Figure 4:
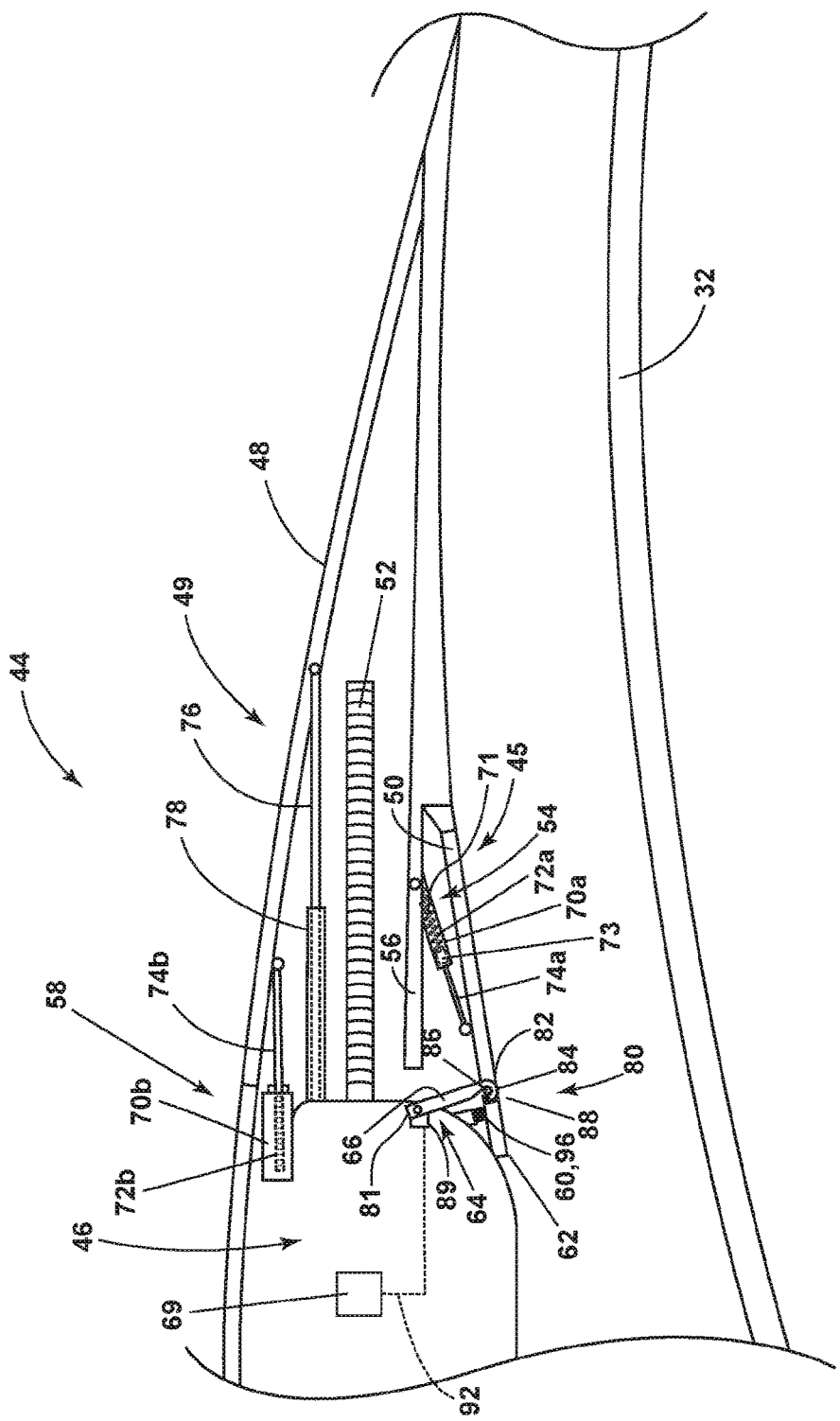
FIG. 4 is an enlarged schematic cross-sectional diagram of the thrust reverser assembly of FIG. 2 in the stowed position.

Turning to FIG. 4, an enlarged view of the thrust reverser assembly 44 is schematically illustrated in the first position 49. A first spring-damper assembly 54 couples the blocker door 50 to an interior portion 56 of the translating cowl 48. The first spring-damper assembly 54 can include, but is not limited to a hydraulic damper 70a including a biasing element 72a and a piston-rod 74a. The biasing element 72a, can include, but is not limited to, a spring 71 and damper 73. The hydraulic damper 70a can be pivotably secured to the interior portion 56 of the translating cowl 48.

The first spring-damper assembly 54 can include any damping mechanism or combination of a damping and sliding mechanisms enabling a combination of damping or sliding motions. The biasing elements 72a has associated spring functions that provide support for the respective equipment to which the biasing element 72a is mounted. The biasing elements 72a can be, by way of non-limiting example, compression, extension, or torsion springs.

A biasing element 60 is operably coupled to a leading edge 62 of the blocker door 50 when the blocker door 50 is in the stowed position 45. The biasing element 60 detachably couples to the leading edge 62 of the blocker door 50. More specifically, the biasing element 60 is in contact with the blocker door 50 when the blocker door 50 is in the stowed position and an initial position and detaches completely from the blocker door 50 when the blocker door 50 moves to the deployed position 45. The biasing element 60 is fixed to a portion 46 of the thrust reverser assembly 44 located aft of the fan cowl 42. The biasing elements 60 can be, by way of non-limiting example, a compression, an extension, or a torsion spring.

A second spring-damper assembly 58 is coupled to the translating cowl 48 at the portion 46 of the thrust reverser assembly 44 located aft of the fan cowl 42 carries. The second spring-damper assembly 58 can include, but is not limited to, a hydraulic damper 70b with a biasing element 72b and a piston-rod 74h. The hydraulic damper 70b can be secured to the portion 46 of the thrust reverser assembly 44 located aft of the fan cowl 42. The piston-rod 74b is configured to move in a substantial axial direction.

It is contemplated that the second spring damping assembly 58 can be similar or the same as the first spring damping assembly 54. It is further contemplated that the biasing element 72a can be the same biasing element as 72h or that the biasing elements 72a, 72b can have different spring functions depending on the characteristics of the blocker door 50 and translating cowl 48 to which each are respectively mounted.

The thrust reverser assembly 44 can further include by way of non-limiting example, a slider 76 and a T-track 78. The translating cowl 48 can be slidably coupled to the slider 76 and the T-track 78 can be mounted at the portion 46 of the thrust reverser assembly 44 located aft of the fan cowl 42. The slider 76 and T-track 78 support the translating cowl 48 and aid in its movement between stowed and deployed positions and vice versa. It should be understood that other support mechanisms are also contemplated.

At a hinged end 81, the latch 66 is carried by a portion 46 of the thrust reverser assembly 44 located aft of the fan cowl 42. A catch 82 is located opposite the hinged end 81 and can selectively operably couple to the blocker door 50 by electively retaining a strike 86 carried by the blocker door 50. The latch assembly 64 is illustrated in a latch position 80, with the blocker door 50 held in the stowed position 45 by the latch 66. The catch 82 includes a strike seat 84. The strike 86 can be shaped to fit in the strike seat 84. A latch keep 88 can also be carried by the blocker door 50 and can hold the strike seat 84 of the latch 66 in the latch position 80.

The latch 66 is in communication with an actuator 89 at the hinged end 81. The actuator 89 can receive a signal from the control module 69 to disengage the latch 66 at the latch keep 88.

While a latch assembly 64 having a latch 66, catch 82, strike seat 84, strike 86 and latch keep 88 is illustrated, the latch assembly 64 is not so limited. It is contemplated that the latch assembly 64 does not include all or some of the parts illustrated and can be a locking mechanism, by way of non-limiting example an electro-magnetic lock, capable of holding the blocker door 50 in the stowed position 45.

Figure 5:
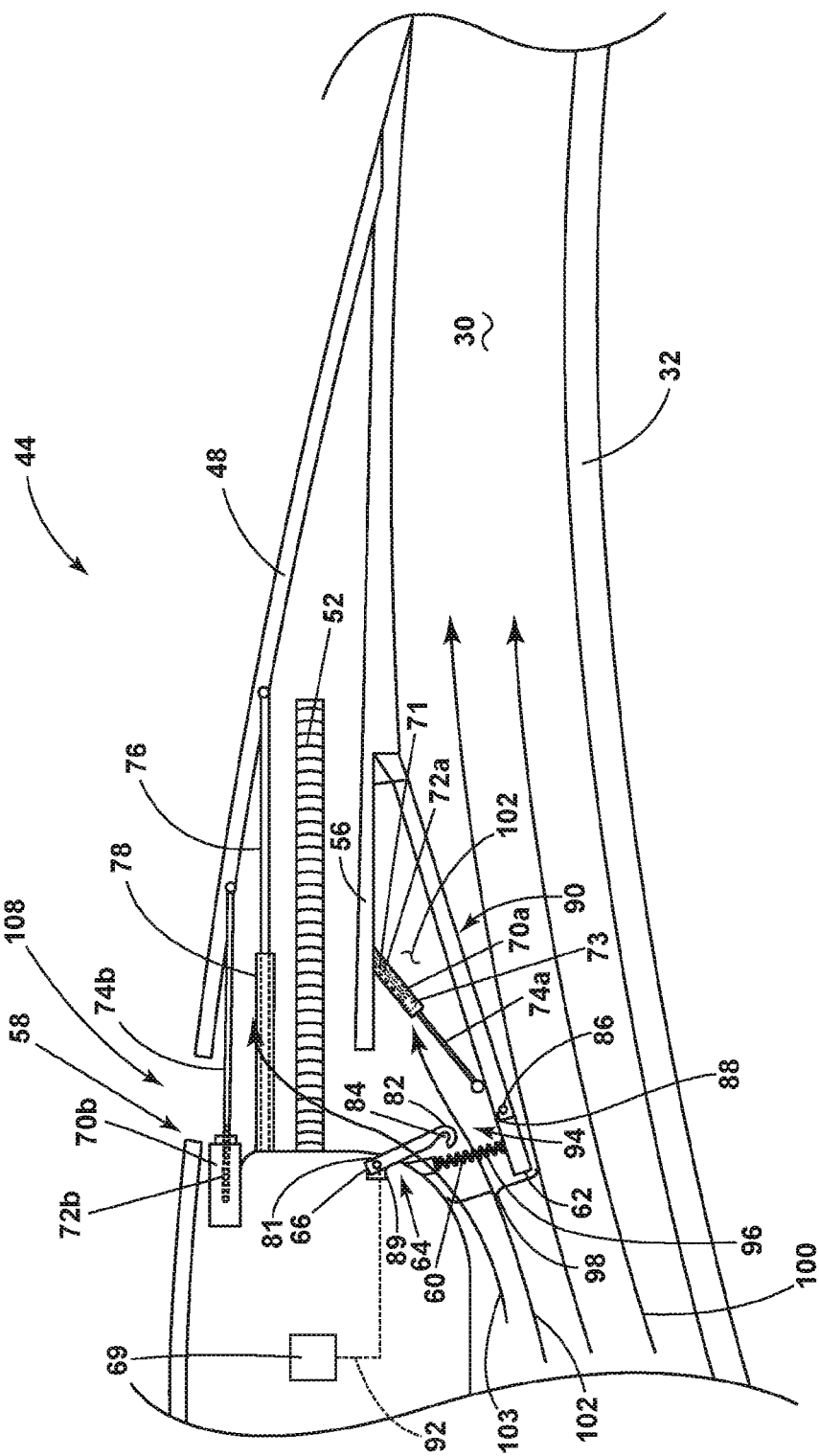
FIG. 5 is an enlarged schematic cross-sectional diagram of the thrust reverser assembly of FIG. 2 in an initial position.

In FIG. 5 the blocker door 50 is shown in an initially open position or an initial position 90. A signal 92 is released from the control module 69 and received at the actuator 89 of the latch assembly 64 to move the latch assembly 64 into a release position 94. The signal 92 received at the actuator 89 causes the actuator to move the latch keep 88 to unlock. More specifically, the strike seat 84 is moved to a release position 94 where the strike seat 84 is disengaged from the strike 86.

After the strike seat 84 is moved to the release position, the biasing element 60 is configured to push the blocker door 50 to the initial position 90. More specifically, when the strike seat 84 is in the stowed position 45 (FIG. 4), the biasing element 60 is compressed and stores elastic energy. When the strike seat 84 is moved to the release position 94 (FIG. 5) the biasing element 60 expands. The expansion of the biasing element 60 releases the stored elastic energy to push the blocker door 50 to the initial position 90.

When the blocker door 50 is pushed to the initial position 90, a gap 98 is formed between the leading edge 62 of the blocker door 50 and the portion 46 of the thrust reverser assembly 44. During operation, bypass airflow 100 from the bypass duct 30 can split into a second and third airflow 102, 104.

The second airflow 102 enters the gap 98 and can flow into an area 106 between the interior portion 56 of the translating cowl 48 and the blocker door 50. The secondary airflow 102 caught proximate the blocker door 50 in the area 106 develops into a scooping effect that initiates moving the blocker door 50 into the deployed position 68, The scooping effect occurs when second airflow 102 flowing in from gap 98 forms pressure in the area 106 proximate the blocker door 50 that is greater than pressure in the bypass duct 30 proximate the blocker door 50. This pressure difference increases as the blocker door 50 opens which causes the blocker door 50 to continue opening toward the deployed position 68 as shown in FIG. 6.

The third airflow 104 flows through the cascade element 52 and pushes on the translating cowl 48 to move the translating cowl 48 to the second position 53. This also occurs due to a scooping effect from the third airflow 104 proximate the translating cowl 48. When the pressure proximate the translating cowl 48 is greater than the pressure outside the nacelle 12, the translating cowl 48 slides along the slider 76. The piston-rod 74b extends creating an opening 108 between the fan cowl 42 and the translating cowl 48.

Figure 6:
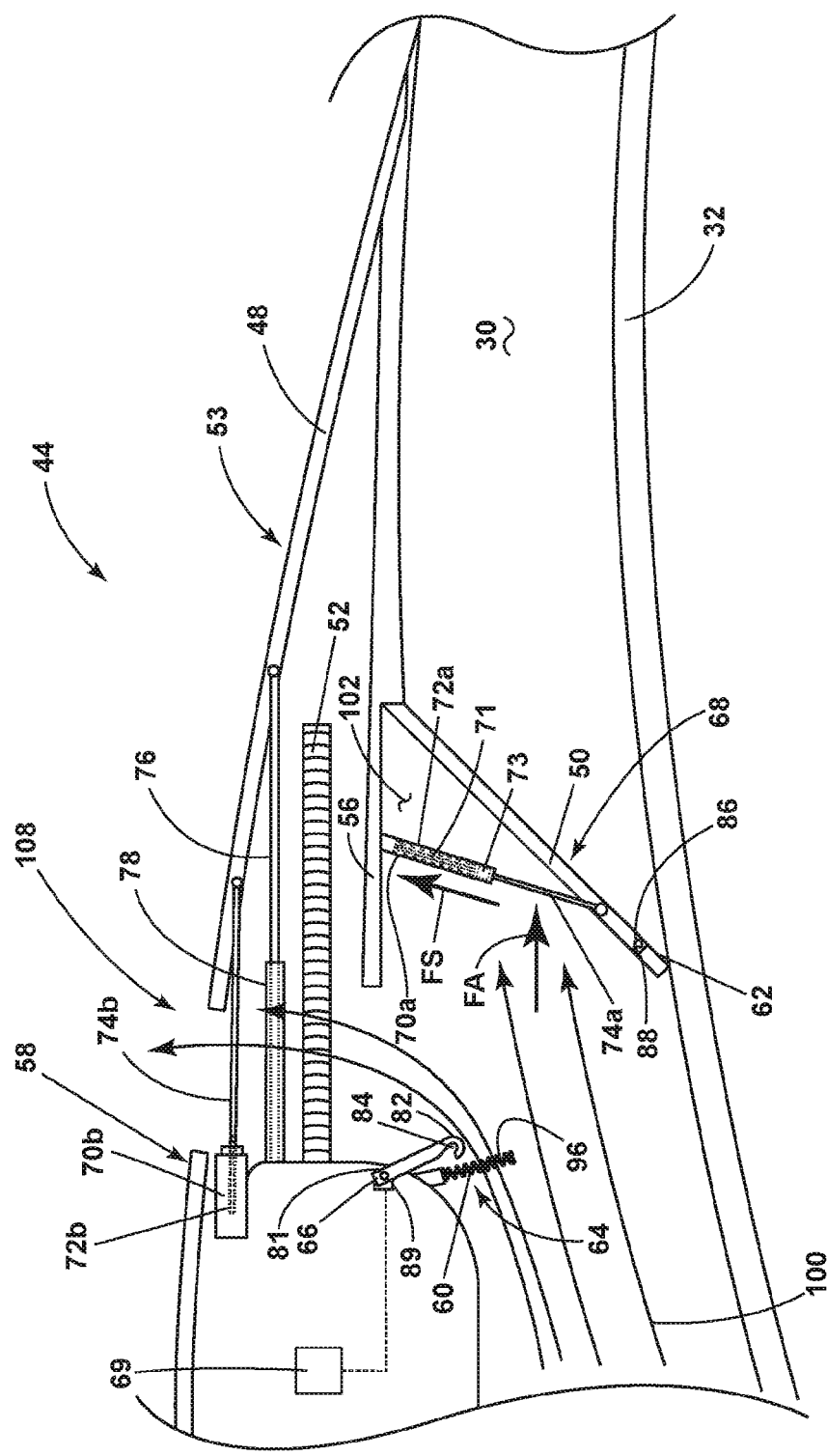
FIG. 6 is an enlarged schematic cross-sectional diagram of the thrust reverser assembly of FIG. 2 in the deployed position.

FIG. 6 illustrates the thrust reverser assembly 44 in the second position 53 with the translating cowl 48 aft the first position 49 (FIG. 2). In the second position 53 the piston rods 74a, 74h of the first and second spring-damper assemblies 54, 58 are extended while the cascade element 52 remains stationary. The first spring-damper assembly 54 is coupled to the blocker door 50 in a deployed position 68 where the blocker door 50 extends into the bypass duct 30 with the leading edge 62 proximate the inner core cowl 32.

When the blocker door 50 is pivoted to the deployed position 68, the biasing element 72a of the spring-damper assembly 54 moderates a speed of the blocker door 50. When the spring 71 is stretched or compressed, the damper provides a damping force to work to maintain moving intensity and slowly moves the piston-rod 74a which in turn moves the blocker door 50 at a controlled speed. Upon reaching a fully deployed position 68, the spring 71 exerts a spring force FS on the piston-rod 74a due to stored spring potential energy. As long as the bypass airflow 100 continues to push the blocker door 50 with an air force FA greater than the spring force FS, the blocker door 50 remains in the deployed position 68. In the deployed position 68, the blocker door 50 deflects the bypass airflow 100 to exit through the cascade element 52 and out of the nacelle 12.

When the translating cowl 48 is in the second position 53, the biasing element 72b of the second spring-damper assembly 58 moderates a speed of the translating cowl 48 in much the same manner as the first spring-damper assembly 54. Upon reaching the second position 53, the biasing element 72b exerts a reaction force FR on the piston-rod 74b due to stored spring potential energy.

In the deployed position 68, the blocker door 50 deflects the bypass airflow 100 to exit through the cascade element 52 and out of the nacelle 12. The third airflow 104 can exit through the opening 108 as long as the bypass airflow 100 continues to push the blocker door 50. The blocker door 50 is coupled to the translating cowl 48 such that it is primarily the air force FA on the blocker door 50 that primarily keeps the thrust reverser assembly 44 in the second position.

When the aircraft 2 slows down such that the bypass airflow 100 decreases velocity to a point where the air force FA is less than the spring force FS, the biasing element 72a will be free to recover. When the bypass airflow 100 has completely stopped, the spring 71 releases all of the stored spring energy to pull the piston-rod 74a back into the hydraulic damper 70a with the damper 73 controlling the speed at which it closes. In this manner the biasing element 72a is used to return the blocker door 50 to the stowed position 45.

The second spring-damper assembly 58 functions in much the same way as the first spring-damper assembly 54. When the bypass airflow 100 slows or comes to a stop the translating cowl 48 is pulled by the biasing element 72b along the T-track 78 back to the first position 49.

Figure 7:
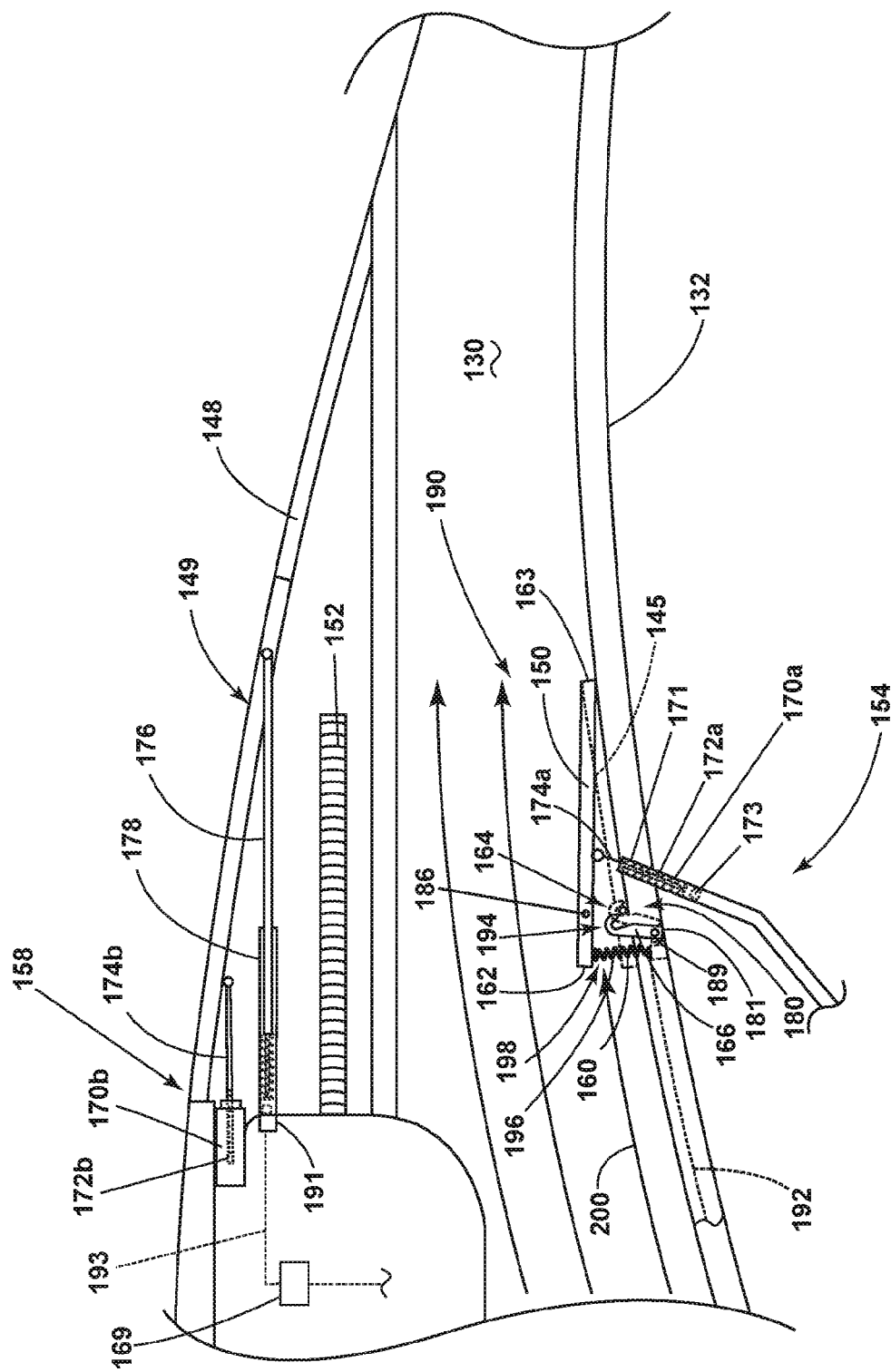
FIG. 7 is a schematic cross-sectional diagram of an exemplary thrust reverser assembly that can be utilized in the aircraft of FIG. 1 in a stowed position.

FIG. 7 depicts another exemplary thrust reverser assembly 144. The exemplary thrust reverser assembly 144 is similar in function to the first exemplary thrust reverser assembly 44 illustrated in FIG. 4, therefore like parts will be identified with like numerals increased by 100. It should be understood that the description of the like parts of the exemplary thrust reverser assembly 44 applies to the other exemplary thrust reverser assembly 144 unless otherwise noted.

One difference is that a blocker door 150 of the thrust reverser assembly 144 includes a trailing edge 163 that is pivotably mounted to an inner core cowl 132 of the engine 10. The blocker door 150 is illustrated in a stowed position 145.

Much like with the thrust reverser assembly 44, a latch assembly 164 in a latch position 180 holds the blocker door 150 in the stowed position 145. The latch assembly 164 can include parts similar in function to the latch assembly 64, including a latch 166. The latch assembly 164 is configured to hold the blocker door 150 such that an airflow 200 can move through the bypass duct 130 with little to no obstruction.

A biasing element 160, by way of non-limiting example a spring 196, is detachably coupled to a leading edge 162 of the blocker door 150. In a stowed position 145, the spring 196 is compressed and stores spring potential energy.

In an initial position 190 illustrated in dashed lines, the latch assembly 164 is actuated to a release position 194. In the release position, the latch 166 is disengaged from a strike 186 such that the blocker door 150 is released. The spring 202 expands leaving a gap 198 between the inner core cowl 132 and the blocker door 150.

A first spring-damper assembly 154 is coupled to the blocker door 150. The spring-damper assembly 154 can include, but is not limited to a hydraulic damper 170a including a biasing element 172a and a piston-rod 74a. The hydraulic damper 170a can house a spring 204 and damper 206 configured to control movement of the blocker door 150. The hydraulic damper 70a can be secured to the inner core cowl 132.

A translating cowl 148 is coupled to a second spring-damper assembly 158 including, but not limited to, a hydraulic damper 170b with a biasing element 172b and a piston-rod 174b. The hydraulic damper 170b can be secured to a portion 146 of the thrust reverser assembly 144 located aft of the fan cowl 42. The piston-rod 174b is configured to move in a substantial axial direction.

The translating cowl 148 can be slidably coupled to the slider 176 and the T-track 178 can be mounted at the portion 146 of the thrust reverser assembly 144 located aft of the fan cowl 42. The slider 176 and T-track 178 support the translating cowl 148. It should be understood that other support mechanisms capable of sliding are also contemplated.

A control module 169 can emit a signal 192 to an actuator 189 in communication with the latch assembly 164 to disengage the latch 166. Simultaneously or sequentially, the control module can emit a signal 193 to a secondary actuator 191 actuator to initiate pushing of the translating cowl 148. The secondary actuator 191 can be in communication with the slider 176 such that when the signal 193 is received at the secondary actuator 191, the slider 176 is pushed axially aft to initiate opening of the translating cowl 148.

When the latch assembly 164 is in a release position, the biasing element 160 can expand and release the stored spring potential energy. This in turn, pushes the blocker door 150 into the initial position 190 (shown in phantom). When the blocker door 150 is in the initial position, bypass airflow 200 enters the gap 198. The blocker door 150 interacts with the bypass airflow 200 and in turn completely deploys into the bypass duct 130. The spring-damper assembly 154 moderates a speed of the blocker door 150 when the blocker door 150 is pivoted to the deployed position 168.

Figure 8:
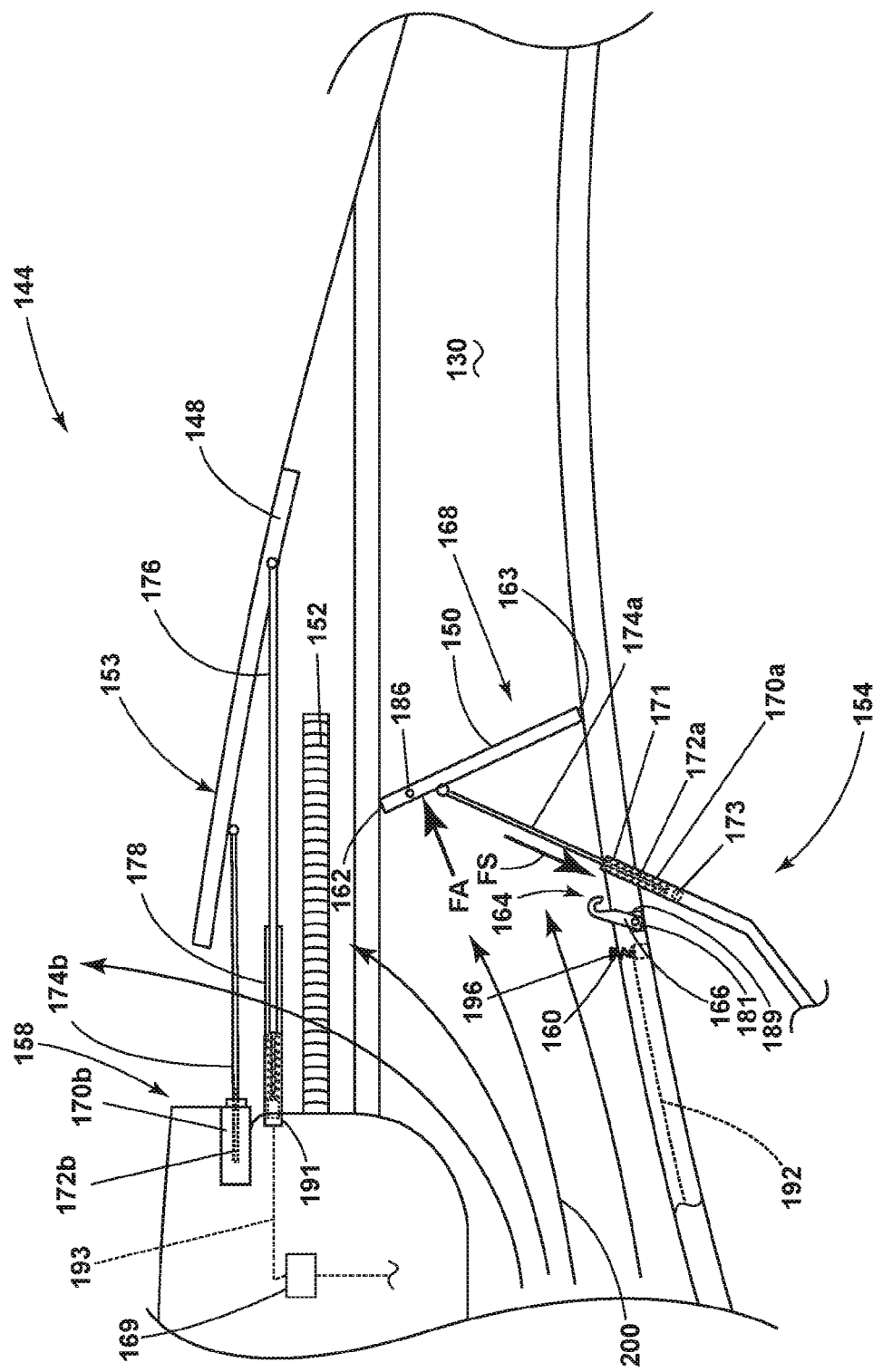
FIG. 8 is a schematic cross-sectional diagram of the thrust reverser assembly of FIG. 7 in a deployed position.

Turning to FIG. 8, the blocker door 150 is in a fully deployed position 168. Upon reaching a fully deployed position 168, the spring 204 exerts a spring force FS on the piston-rod 174a due to stored spring potential energy. As long as the bypass airflow 200 pushes on the blocker door 150 with an air force FA greater than the spring force FS, the blocker door 150 remains in the deployed position 168. In the deployed position 68, the blocker door 150 deflects the bypass airflow 200 through the cascade element 152.

In an alternative method of opening the translating cowl 148, bypass airflow 200 is redirected to exit through a cascade element 152 and allowed to push on the translating cowl 148. The translating cowl 148 is passively moved aft by the force of air FA. As the piston-rod 174b moves out of the hydraulic damper 170h, spring potential energy is stored in the biasing element 172h.

In much the same way as the thrust reverser assembly 44, when the aircraft 2 slows or comes to a stop, the bypass airflow 200 in the thrust reverser assembly 144 also decreases. When the spring force FS is greater than the air force FA, the hydraulic damper 170a pulls the blocker door 150a back into the stowed position. The stored spring potential energy in the biasing element 172b releases in a similar manner pulling the translating cowl 148 back to a first position 149.

Figure 9:
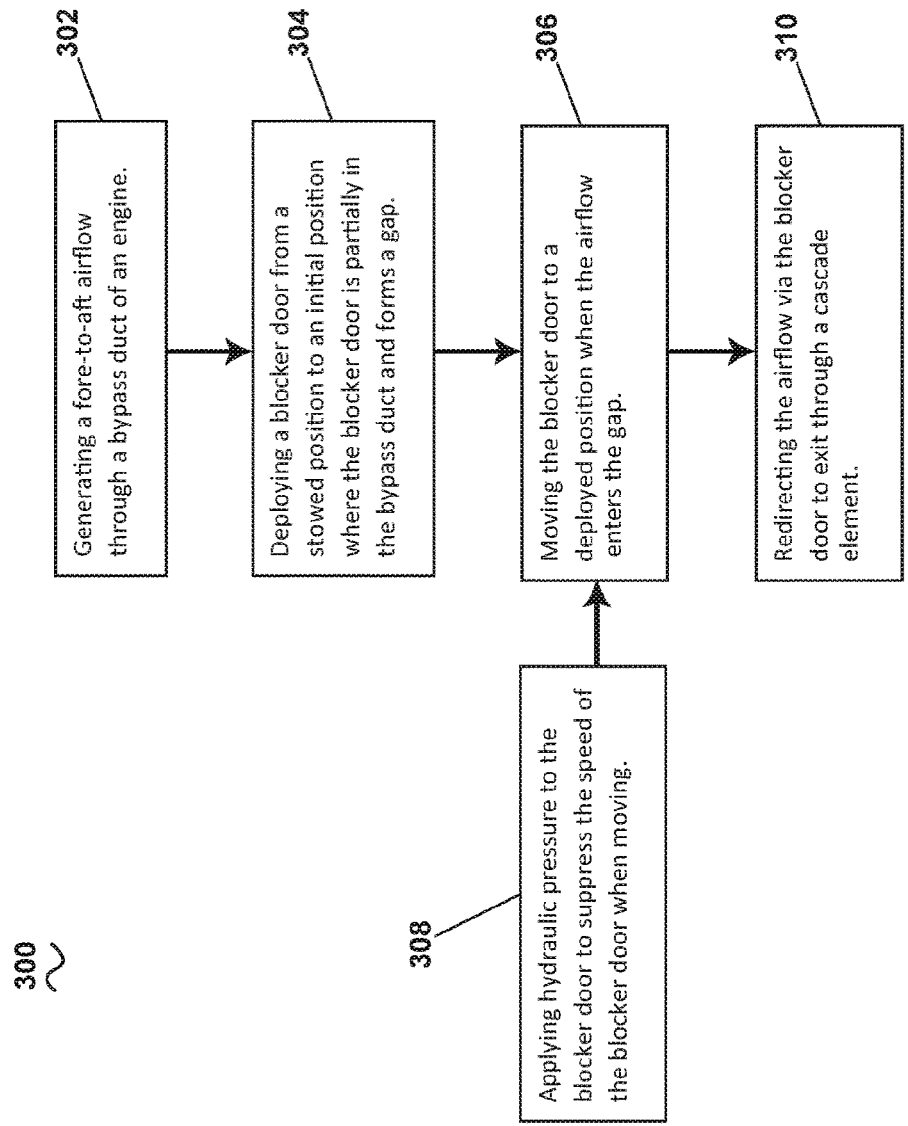
FIG. 9 is a flow chart illustrating a method of moving the thrust reverser assembly according to aspects described herein to a deployed position.

Turning to FIG. 9, a flow chart illustrates a method 300 of operating an engine, such as the engine 10 of the aircraft 2. At 302, the method 300 begins by generating a fore-to-aft bypass airflow 100, 200 through the bypass duct 30, 130 of the engine 10. At 304, the blocker door 50, 150 is deployed from the stowed position 45, 145 to the initial position 90, 190. This can be done by releasing the latch assembly 64, 164 and having the leading edge biased away from the stowed position. When the blocker door 50, 150 is partially within the bypass duct 30, 130, the leading edge 62, 162 of the blocker door 50, 150 forms the gap 98, 198 with a portion of the aircraft engine.

At 306, the blocker door 50, 150 is moved to the deployed position 68, 168 when the bypass airflow 100 moving through the bypass duct 30 enters the gap 98, 198. The translating cowl 48, 148 can be simultaneously moved with the blocker door 50, 150 from the first position 49, 149 to the second position 53, 153 based on the bypass airflow 100 interacting with the translating cowl 48, 148 or via the secondary actuator 191.

The method 300 can also optionally include, at 308, applying hydraulic pressure to provide a damping force to suppress the speed of the blocker door 50, 150 moving to the deployed position 68, 168. The method 300 can further include at 310 redirecting, via the blocker door 50, 150 in the deployed position 68, 168, the bypass airflow 100 to exit through the cascade element 52, 152.

The thrust reverser assemblies described herein include eliminating links associated with traditional thrust reverser assemblies within the bypass duct during operation enabling an increase of bypass airflow and decreasing aerodynamic resistance during operation. The bypass airflow provides lower fuel consumption in an operating engine, with less resistance, the fuel efficiency is increased. The thrust reverser assemblies described herein also require less power to actuate by utilizing the bypass bypass airflow to move the blocker door. Further, such airflow can also be utilized to move the translating cowl. Utilizing the bypass airflow 100 also contributes to a quicker deployment of the blocker door, which can contribute to a quicker stopping of the aircraft leading to a need for shorter runways for landing the aircraft. Additionally traditional thrust reverser assemblies utilize actuator mechanisms which undergo high stress during the opening and closing of the translating cowl and blocker doors. With the thrust reverser assembly described herein, the hydraulic dampers minimize or eliminate the high stress areas.

In any of the above various aspects, a protective coating, such as a thermal barrier coating, or multi-layer protective coating system can be applied to the cowls or engine components. The various aspects of systems, methods, and other devices related to the present disclosure disclosed herein provide an improved thrust reverser assembly, particularly in regard to passively deploying a blocker door in a thrust reverser assembly.

These combined benefits will be manifested as reduced specific fuel consumption or improved engine performance versus a conventional thrust reverser.

To the extent not already described, the different features and structures of the various embodiments may be used in combination with each other as desired. That one feature may not be illustrated in all of the embodiments and is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the present disclosure, including the best mode, and to enable any person skilled in the art to practice the present disclosure, including making and using any devices or systems and performing any incorporated methods. The patentable scope of the present disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A thrust reverser assembly for a turbine engine including a core engine, a nacelle surrounding at least a portion of the core engine to at least partially define a bypass duct between the nacelle and the core engine, including:
    a translating cowl moveable between a first position and a second position;
    a fixed cascade element located within the translating cowl when the translating cowl is in the first position;
    a blocker door having a leading edge and a trailing edge that is operably coupled to the translating cowl and where the blocker door is movable between a stowed position wherein the blocker door forms a portion of the bypass duct and a deployed position, where the blocker door extends into a bypass duct conduit to deflect an airflow through the cascade element;
    a biasing element operably coupled to the blocker door and configured to push the blocker door from the stowed position into an initial position wherein the blocker door is partially within the bypass duct conduit and the leading edge forms a gap with a portion of the thrust reverser assembly through which the airflow enters the gap;
    a spring-damper assembly operably coupled to the blocker door and wherein the spring-damper assembly is configured to moderate a speed of the blocker door as the blocker door moves to the deployed position; and
    a second spring-damper assembly operably coupled to the translating cowl and wherein the spring-damper assembly is configured to bias the translating cowl to the first position.

2. The thrust reverser assembly of claim 1, further comprising a latch assembly operable between a latch position, where the blocker door is held in the stowed position, and a release position, where the blocker door may be pivoted to the deployed position.

3. The thrust reverser assembly of claim 2, wherein the latch assembly includes
    a latch keep carried by one of the blocker door and a portion of the thrust reverser assembly and having a strike seat in which a strike may be removably received, and
    a latch carried by the other of the blocker door and the portion of the thrust reverser assembly and having a catch configured to engage the strike.

4. The thrust reverser assembly of claim 2, further comprising a Full Authority Digital Engine/Electronics Control configured to control a movement of the latch assembly to the release position.

5. The thrust reverser assembly of claim 1 wherein the spring-damper assembly further includes a biasing element that is configured to move the blocker door to the stowed position when the airflow through the bypass duct is stopped.

6. The thrust reverser assembly of claim 5 wherein the biasing element is further configured to move the blocker door towards the stowed position when the airflow through the bypass duct reduces with a slowing speed of an aircraft.

7. The thrust reverser assembly of claim 1, wherein the blocker door is configured to create a scooping effect that moves the blocker door to the deployed position and moves the translating cowl to the second position.

8. A method of operating an aircraft engine, comprising: the aircraft engine comprising: a thrust reverser assembly for the aircraft engine including a core engine, a nacelle surrounding at least a portion of the core engine to at least partially define a bypass duct between the nacelle and the core engine, including: a translating cowl moveable between a first position and a second position; a fixed cascade element located within the translating cowl when the translating cowl is in the first position; a blocker door having a leading edge and a trailing edge that is operably coupled to the translating cowl and where the blocker door is movable between a stowed position wherein the blocker door forms a portion of the bypass duct and a deployed position, where the blocker door extends into a bypass duct conduit to deflect an airflow through the cascade element; a biasing element operably coupled to the blocker door and configured to push the blocker door from the stowed position into an initial position wherein the blocker door is partially within the bypass duct conduit and the leading edge forms a gap with a portion of the thrust reverser assembly through which the airflow enters the gap; a spring-damper assembly operably coupled to the blocker door and wherein the spring-damper assembly is configured to moderate a speed of the blocker door as the blocker door moves to the deployed position; and a second spring-damper assembly operably coupled to the translating cowl and wherein the spring-damper assembly is configured to bias the translating cowl to the first position, the method comprising generating a fore-to-aft airflow through the bypass duct of the aircraft engine; and deploying the blocker door from the stowed position to the initial position where the blocker door is partially within the bypass duct such that the leading edge of the blocker door forms the gap with the portion of the thrust reverser assembly, and moving the blocker door to the deployed position when the airflow passes through the gap to interact with the blocker door such that the blocker door is moved to the deployed position.

9. The method of claim 8 wherein the deploying the blocker door to the initial position comprises unlatching the leading edge of the blocker door.

10. The method of claim 8 wherein the deploying the blacker door to the initial position comprises biasing the leading edge of the blocker door to the initial position.

11. The method of claim 8, further comprising applying hydraulic pressure to provide a damping force to suppress the speed of the blocker door moving to the deployed position.

12. The method of claim 8, wherein the translating cowl is simultaneously moved with the blocker door from the first position to the second position based on the airflow.

13. The method of claim 12, further comprising redirecting, via the blocker door in the deployed position, the airflow to exit through the cascade element that is located within the translating cowl when the translating cowl is in the first position.

* * * * *